United States Patent [19]

Wilson

[11] Patent Number: 5,456,014
[45] Date of Patent: Oct. 10, 1995

[54] MECHANICAL LEVELING DEVICE

[76] Inventor: Harold I. Wilson, 1813 E. 1550 S., Gooding, Id. 83330

[21] Appl. No.: 198,133

[22] Filed: Feb. 16, 1994

[51] Int. Cl.[6] .............................. G01C 9/36; G01C 9/02
[52] U.S. Cl. .............................................. 33/390; 33/335
[58] Field of Search ......................... 33/335, 336, 337, 33/340, 341, 384, 385, 386, 387, 388, 390; 340/431, 440

[56] References Cited

U.S. PATENT DOCUMENTS

| | | | |
|---|---|---|---|
| 1,274,696 | 8/1918 | DeLay | 33/342 |
| 1,409,537 | 3/1922 | Franzen | 33/390 |
| 1,423,529 | 7/1922 | King et al. | 33/390 |
| 2,008,816 | 7/1935 | Canon | 33/521 |
| 2,083,841 | 6/1937 | Hall | 33/521 |
| 2,161,704 | 6/1939 | Foster | 33/340 |
| 2,194,995 | 3/1940 | Bergquist | 33/337 |
| 2,660,804 | 12/1953 | Mundy | 33/388 |
| 3,409,993 | 11/1968 | Hansen | 33/390 |
| 3,657,695 | 4/1972 | Birmingham | 340/52 H |
| 3,660,840 | 5/1972 | Plofchan | 340/421 |
| 3,701,093 | 10/1972 | Pick | 340/440 |
| 3,766,657 | 10/1973 | Hopkins | 33/348 |
| 3,857,188 | 12/1974 | Foster et al. | 33/388 |
| 4,542,592 | 9/1985 | Hopkins | 33/386 |
| 4,567,666 | 2/1986 | Neis et al. | 33/180 R |
| 4,760,649 | 8/1988 | Preston et al. | 33/333 |
| 4,974,801 | 12/1990 | Pulsifer | 248/181 |
| 5,136,784 | 8/1992 | Marantz | 33/366 |

FOREIGN PATENT DOCUMENTS 0052409  3/1987  Japan ................... 33/335

OTHER PUBLICATIONS

Leveling Indicator for Motorhomes and RV'S, J. C. Whitney Catalog, Chicago Ill., (No Month), 1994, p. 101.

*Primary Examiner*—Thomas B. Will

[57] ABSTRACT

A mechanical vehicle leveling device having a circular leveling bubble and four semicircular, mechanical measurement indicators revealed in a top cover unit of the device. The measurement indicators indicate the number of inches each wheel must be raised or lowered to level a vehicle. Four feet rotate the semi-circular indicators when the cover unit is manually adjusted relative to the base unit. The cover unit is adjusted to center the leveling bubble, whereby the movement actuates the four indicator scales to indicate whether to raise or lower each wheel by the indicated inches. A cam adjustment lever can be adjusted to compensate the indicators for wheelbase distance.

1 Claim, 2 Drawing Sheets

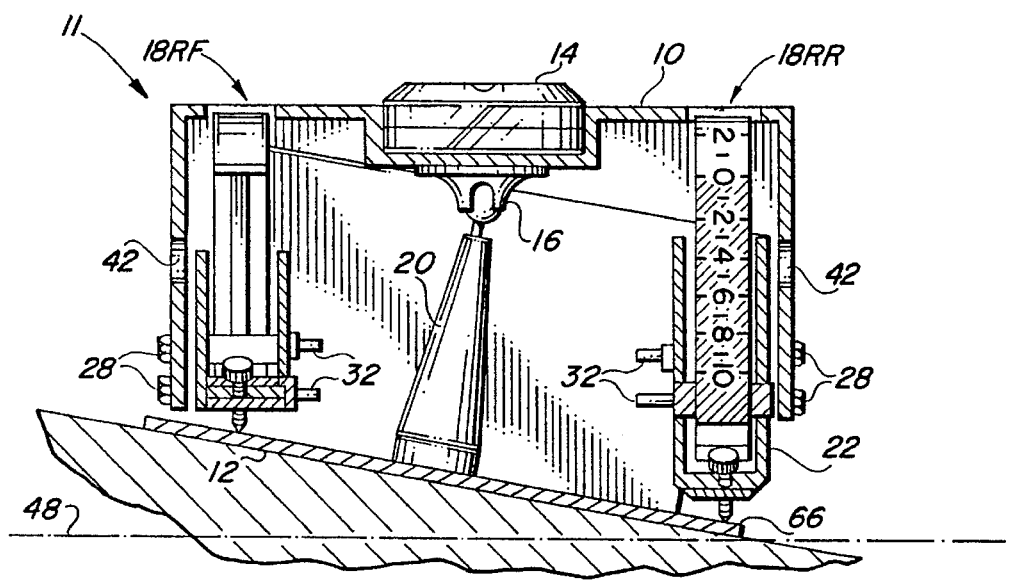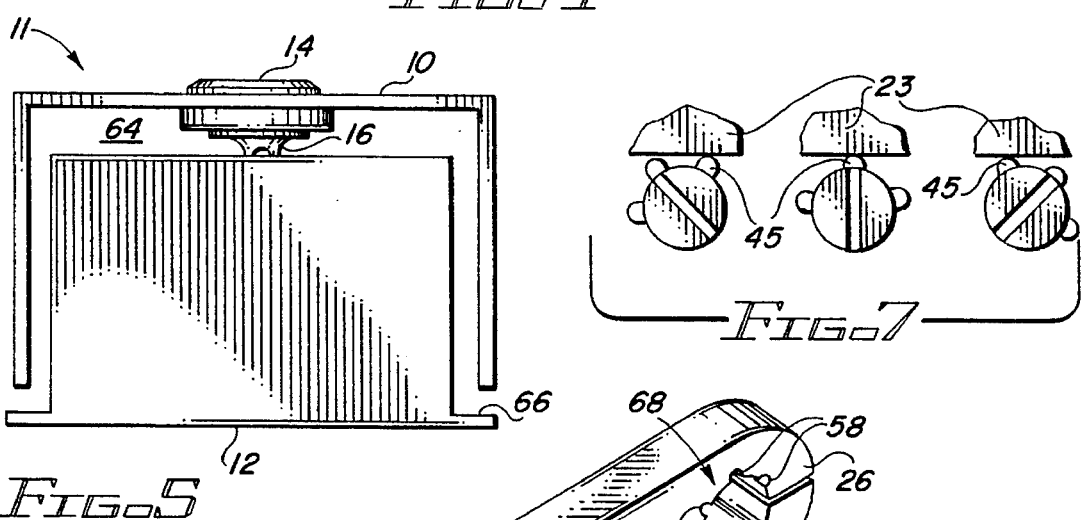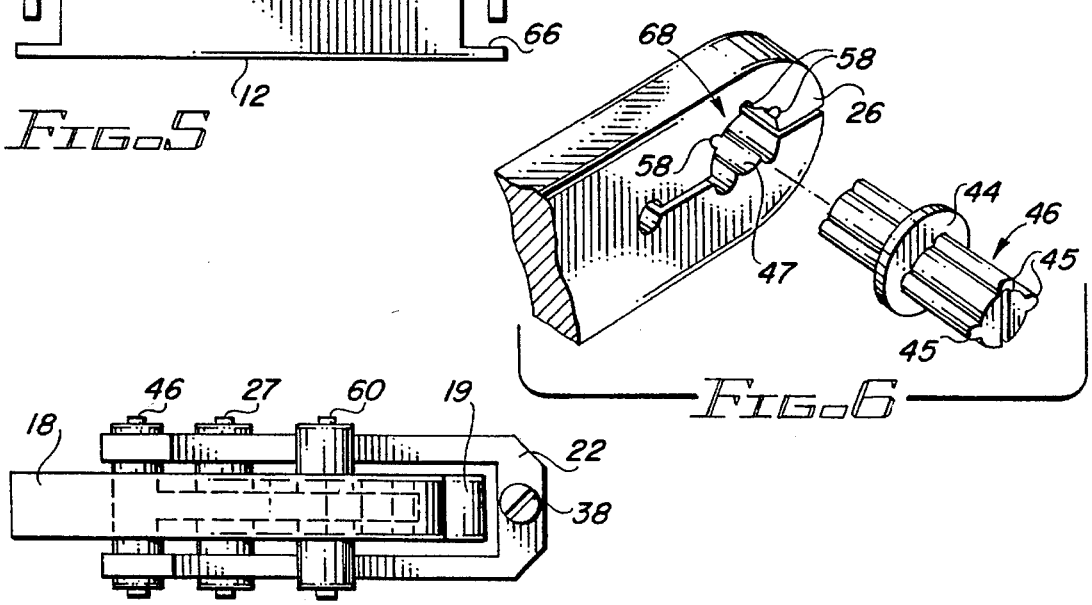

MECHANICAL LEVELING DEVICE

BACKGROUND

1. Field of the Invention

This invention relates to recreational vehicles, specifically to an improved level indicating device for motorhomes or like vehicles with four ground contact points.

2. Description of Prior Art

Leveling a heavy motorhome is a difficult task without the use of optional and very expensive hydraulic or electric levelers as explained by Pulsifier U.S. Pat. No. 4,974,801 Dec. 4, 1990. These levelers frequently run $3000.00 to $4500.00. Due to this additional expense most motorhome owners opt to carry wooden or plastic blocks and boards to place on the ground in ramplike fashion to the estimated height required for the individual wheels to bring the vehicle to a near level position. The vehicle is then driven up on the blocks, which usually requires several attempts at rearranging the height of the blocks before a satisfactory near level position can be obtained. This near level position is required for proper operation of recreational vehicle refrigerators, also stated by Pulsifer U.S. Pat. No. 4,974,801 and Marantz U.S. Pat. No. 5,136,784 Aug. 11, 1992. Severe damage to refrigerator units can occur if units are improperly leveled. Pulsifier's invention levels the appliance only and does not deal with leveling the entire vehicle which is important for the comfort of the occupants as well as the proper operation of doors, the drainage of sinks and tubs, to name a few. Marantz U.S. Pat. No. 5,136,784 differs due to the fact that it is electronic, does not indicate in inches the height to stack blocks for the individual wheels and is relatively expensive.

Most existing leveling devices are designed to level a vehicle with a two step operation, as with a camping trailer which has centrally located axle or axles and can simply be towed up on ramps or blocks to level horizontally. Being much lighter than motorhomes, trailers are sometimes raised with mechanical jacks to a horizontal position. With the horizontal leveling accomplished, which is step one, step two is simply a matter of raising or lowering the hitch end of the trailer unit until it is leveled longitudinally. Motorhome leveling is much different. With the axles located near the ends of the vehicle it can easily be seen that the same method does not work for leveling a motorhome. Recreational vehicle users frequent campgrounds and the like that are most often on uneven terrain. A motorhome on uneven terrain would be unlikely to have more than one wheel on the same elevation. To level the vehicle without the use of expensive jacks can only be accomplished by stacking blocks and boards as described above to the required height for the individual wheels and then driving the vehicle up on the blocks. Keeping the above in mind it can easily be seen why a leveling device that gives simultaneous readings for the four corners of a vehicle in inches is greatly needed by motorhome users.

Several patents have been issued for recreational vehicle leveling devices. For example, U.S. Pat. Nos. 4,542,592 to Hopkins (1985), 4,760,649 to Preston (1988), 4,567,666 to Neis (1986), 3,657,695 to Birmingham (1972), and 3,660,840 to Plofchan (1972). Of the aforementioned leveling devices none address the problem of giving the user a four point readout in inches, high or low, in order for a four wheeled vehicle to attain a level position in one simple maneuver. All leveling devices heretofore known suffer from a number of disadvantages:

(a) Leveling devices that simply give an indication that your vehicle is off true horizontally longitudinally and transversely are of little value when blocks must be placed at several points to a particular height in order to level a 10,000 to 20,000 lb. vehicle.

(b) Leveling devices designed for camping trailers are not suitable for motorhome leveling due to the fact that trailers can be towed slowly onto a ramp for lateral leveling and then the tongue can be lowered or raised for longitudinal leveling. This can be in two separate steps with different requirements for the leveling device. They are not designed for four point leveling.

(c) Electronic levels often require installation which is usually quite expensive and often require expensive maintenance.

(d) A leveling device that indicates a particular corner of a motorhome is low is of little use to a user who then must estimate the number of inches of blocks to stack at possibly three points before driving his vehicle up on them for a level vehicle.

(e) Mainly they do not provide measurements for leveling four wheels simultaneously.

SUMMARY OF THE INVENTION

The objects and advantages of this invention are:

(a) To provide a reasonably priced mechanical leveling device that is simple to operate and does not require expensive installation.

(b) To provide a leveling device that gives simultaneous readings for four corners of a vehicle in inches low and high as required for the proper leveling of a motorhome.

(c) To provide the vehicle operator with adequate elevational information in inches so that numerous attempts are not required before a level condition can be met.

(d) To provide RV owners/operators a means to level their vehicles in a much faster way than was previously possible with other methods.

(e) To assist motorhome and other RV operators and owners in protecting their refrigerators and other appliances from expensive damage due to improperly leveled vehicles.

(f) To make it possible for motorhome and other RV users to park in locations they previously would not attempt due to the problems of leveling a four wheeled vehicle.

Further objects and advantages are to provide a leveling device that is compact for easy storage and is able to withstand the rigors of jostling about in an RV, both of which are pretty much of a requirement for RV equipment. Still further objects and advantages will become apparent from a consideration of the ensuing descriptions and drawings.

The invention simply stated consists of a four-point, mechanical, vehicle leveling device comprising:

a base unit;

a pivotal support attached to the base;

an upper housing affixed to the pivotal support;

a horizontal level indicating means affixed to the upper housing; and four mechanical measuring indicating means affixed to the upper housing having a ratio adjustment means, said measuring indicating means giving indication of elevational difference at four points relative to a true level surface, whereby vehicle attitude adjustment can

BRIEF DESCRIPTION OF THE DRAWINGS

FIG. 4 shows an end elevational view partially in section of the leveling device.

FIG. 5 shows an elevational view with clearance and attachment between upper housing and base.

FIG. 6 shows an enlarged exploded view of crank of FIG. 3 and cam of FIG. 3.

FIG. 7 shows cam detent positions for changing indicator ratios.

FIG. 8 shows a side elevation view of an indicator assembly of FIG. 3.

DESCRIPTION OF THE PREFERRED EMBODIMENTS

Figure 1:
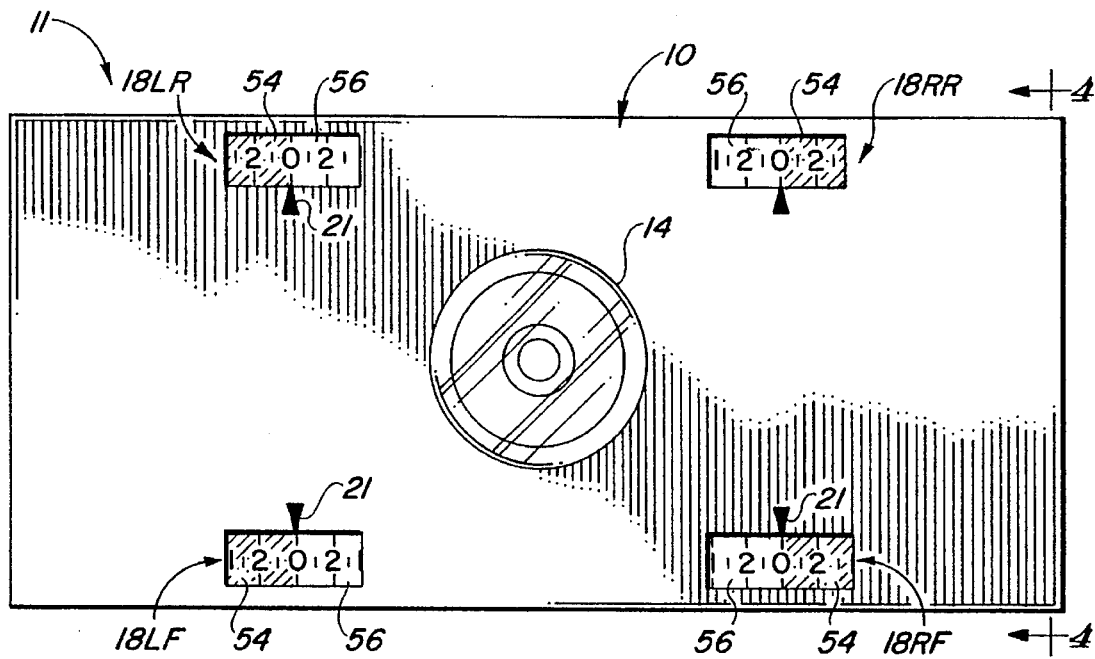
FIG. 1 shows a top view with indicators and bubble level.
Figure 3:
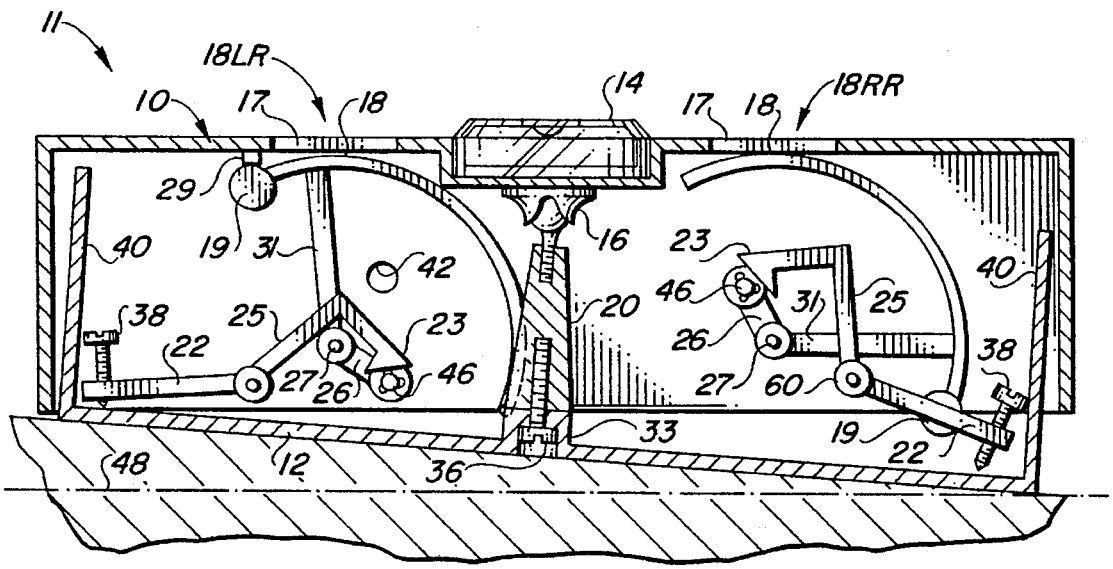
FIG. 3 shows a side elevational view partially in section of the leveling device.

Referring particularly to FIG. 1, a top view of a leveling device 11 shows a rectangular shaped cover or an upper housing 10, a circular bubble level 14 located center, and near each corner an indicator scale 54,56 is revealed through the upper housing 10. A pointer 21 is located center of each indicator slot 17 (FIG. 3). The four indicators 18 being a requirement as a representative of each wheel or the four corners of the motorhome or vehicle being leveled.

Figure 2:
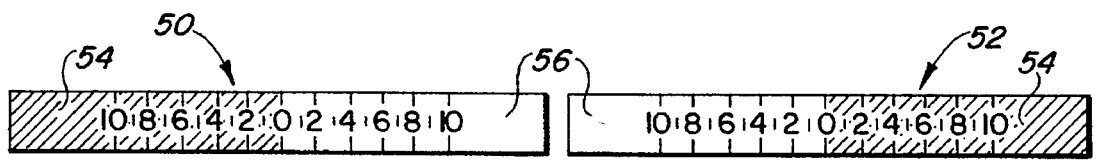
FIG. 2 shows a top view of the opposing indicator scales.

FIG. 2 shows the configuration of the two opposing types of scales 50,52 with 18LR and 18RR requiring the shaded half of the scale 54 (high indication) to be located towards the left end of the leveling device 11, while the indicators to the right of the user require the shaded half of scale 54 to be to the right. This being due to the opposing directions of the indicators 18.

FIGS. 3 and 4 are representative of the four quadrants with FIG. 3 showing the two rear quadrants with their associated indicator assemblies 18LR and 18RR. An indicator assembly being composed of a foot 22, a crank 26 and the associated parts that actuate the rotary movement of an indicator 18. The two maximum extended positions are shown in both FIGS. 3 and 4, with true horizontal 48 in contrast to a base 12 as shown is resting on an inclined surface. A ball and socket or swivel 16 combined with a post 20, connects upper housing 10 to base 12.

FIG. 4 shows an end view of the leveling device 11, with the left side on an incline as opposed to true horizontal 48. Indicator assembly 18LF is shown completely retracted while indicator assembly 18RR is fully extended due to the upper housing 10 being in a true horizontal position 48 as opposed to base 12 being on an inclined position.

FIG. 5 shows the suspension of upper housing 10 and the required space or separation 64 between upper housing 10 and base 12. The one attachment being ball and socket 16.

FIG. 6 is an enlarged exploded view of a cam 46 and a crank 26 which allows for compensation of differing wheelbase lengths. FIG. 7 shows three possible cam positions with one cam ridge 45 contacting a shoe 23 at any one time.

FIG. 8 shows a side elevation of an indicator assembly 18. The units being designed so as to operate in any one of the four positions left or right.

Description of Operation FIGS. 1, 2, 3, 4, 5, 6, 7, 8

This mechanical leveling device invention comprises a circular leveling bubble 14 (FIG. 1) and four semi-circular, mechanical, measurement indicators 18 (FIG. 3) revealed in a top cover or upper housing 10 of the device. The measurement indicators indicate the number of inches each wheel must be raised or lowered to level a vehicle, such as a motorhome. Four feet 22 rotate the semi-circular indicators when the upper housing 10 is manually adjusted relative to a base unit 12. The upper housing 10 is adjusted to center the leveling bubble 14, whereby the movement actuates the four indicator scales FIG. 2-50,52 (parts 50 and 52 of FIG. 2) to indicate whether to raise or lower each wheel by the indicated inches. A cam 46 can be adjusted to compensate the indicators for wheelbase distance.

With leveling device 11 which is generally a rectangular shaped instrument a circular bubble is provided near the center of the instrument. Indicator assemblies (FIG. 1) 18LR, 18RR, 18LF, 18RF are located near each corner. These indicator assemblies 18LR, 18RR, 18LF, 18RF are representative of the four corners of the vehicle to be leveled. The user only has to place the leveling device 11 upon a counter or other surface that is parallel with the floor of the vehicle. The leveling device 11 being longitudinally aligned with the vehicle upper housing 10 would be manipulated until the bubble is centered on circular level 14. The individual indicators 18 would then indicate in numerals and the difference in the shading of 50,52 whether a particular wheel or corner was high or low and indicate the number of inches. FIG. 2 depicts the differences of the opposing scales required for the left and right ends of the device 11. The shaded half 54 indicates a high or above level condition. The plain half 56 indicates a below level condition. To level a vehicle the user would note the high or low condition of the individual indicators 18. User would then under normal conditions ignore the high indicators FIG. 2-54 and read the low indicators 56 which would show the user the number of inches each individual wheel needs to be raised in order to bring the vehicle to a level condition. If conditions permit lowering of the wheels such as a vehicle parked on blocks that are uneven, the user would ignore the low scales 56 and read the high 54, which would require removal of the number of inches of blocking indicated in the scales 50,52.

Within the level indicating device 11 is a ball and socket unit 16 which allows the upper housing 10 to be swiveled a limited distance in any direction. There being sufficient tension between ball and socket 16 to hold upper housing in any position stopped, but still easily manipulated. Ball and socket 16 which is cemented to the center of upper housing 10 is attached to post 20 by means of a screw which is a machined part of the ball and socket unit 16. Post 20 attaches to base 12 by means of a screw 36 through a recessed screw hole 33. Before attaching upper housing 10 to base 12, four indicator assemblies 18RR, 18LR, 18RF, and 18LF are installed inside the four quadrants of said housing by means of pins FIG. 4-28 and held in place with keepers 32. The keepers 32 being a short section of vinyl sleeving material which fits the pins snugly. The indicator assembly 18RR, 18LR, 18RF, and 18LF of FIG. 3 is composed of two units per quadrant that when working together as an assembly convert fractional vertical movements of feet 22 to readable rotational movement of indicators 18, by means of ratio increase with leverage when the two units are combined FIG. 3. Also as can be seen in FIG. 8, the two units are designed so as to be used in any one of the quadrants by being reversible. When the four assemblies 18RR, 18LR, 18RF, and 18LF are installed with pins FIG. 4-28 the four indicators 18 appear in slots FIG. 3-17. With the four assemblies 18RR, 18LR, 18RF, and 18LF installed and the upper housing 10 upright suspended with the circular bubble level 14 on top, all four indicators 18 will show a maximum reading on the low side of scales FIG. 2-56 because the center of balance FIG. 3-19 being restricted in travel by upper housing 29 rotates back and downward forcing crank 26 and cam 46 upward against shoe 23. Shoe 23 being moved upward rotates foot 22 down and without base 12 being attached four indicators by force of gravity rotate downward until being stopped by indicator arm 31 contacting hub 60. When base 12 is brought up against post 20 and attached with screw 36, the four indicator assemblies 18RR, 18LR, 18RF, and 18LF are all brought to an active or loaded position by the feet being moved upward against the downward force of gravity as explained earlier. Then with the entire leveling device placed on a true horizontal surface and the circular level bubble 14 centered, each of the four calibration screws 38 are adjusted upward or downward until the four indicators read 0. The leveling device 11 is then ready for use. To further explain the operation FIG. 3 shows the left rear 18LR and the right rear 18RR indicators on a sloping surface as indicated by true horizontal 48. The bubble level 14 with bubble centered causes the upper housing 10 on the left rear corner of the device 11 to be pushed down against the base 12 to the maximum. This pushes upward on calibration screw 38 and foot 22 which in turn pushes downward on shoe 23 which is constantly engaged with cam 46. Cam 46 being part of crank 26 rotates indicator 18 and gives a maximum reading on the high side of scales FIG. 2-54. The same view shows the right rear corner with upper housing 10 in the maximum low position with base 12 moved downward away from the level position of upper housing 10. Again the force of gravity pulling downward on balance 19 rotates crank 26 upward with cam 46 against shoe 23 which in turn causes foot 22 and calibration screw 38 to push downward staying in constant contact with base 12.

FIG. 4 shows an end view of the right front 18RF and the right rear 18RR indicator assemblies with base 12 of leveling device 11 on a sloping surface as indicated by true horizontal 48. Assembly 18RF is compressed to the minimum giving a high reading while assembly 18RR is extended to the maximum which would give a low reading of the maximum low shown on a scale FIG. 2-56. FIG. 3 also shows bumpers 40 being over-extended by upper housing 10. The bumpers 40 preventing the upper housing 10 from rotating on base 12. FIG. 5 shows a separation 64 between upper housing 10 and base 12. The separation 64 is required to enable upper housing 10 to swivel freely a limited distance in any direction. It can be noted in FIGS. 4 and 5-66 that the sides of base 12 are wider than upper housing 10 in order to prevent indicator assemblies 18RR, 18LR, 18RF, and 18LF from losing contact with base 12, by rotating too far to the side.

FIG. 6 shows an enlarged exploded view of a cam 46 and crank 26. The purpose of the cam 46 is to provide a means of adjusting for wheelbase length of the vehicles that are to be leveled. The middle adjustment or detent 58 of cam 46 would be for the average of the common wheelbase lengths. The second detent 58 would be an average of the shortest one third of wheelbase lengths, while the third detent 58 would be the longest one third up to a limited number of inches. The detent 58 positions would change ratio of the rotary travel of indicators FIG. 3-18 by moving the contact point of shoe 23 and crank 26. With the contact point closer to axis 27 the ratio will be increased. With the contact point further away the ratio would decrease as would be required with a longer wheelbase vehicle. The three detent 58, FIG. 6, positions would be aligned with the axis FIG. 3-27 as shown by FIG. 6-68. The purpose of the alignment being to maintain the same indicator FIG. 3-18 settings and to avoid re-calibration each time cams 46 are changed. The contact face of shoe 23 must also be in alignment with hub 60 for the same reason. FIG. 6 shows cam 46 with three cam ridges 45 and stop ring 44 all molded in one piece of a plastic material. The cam ring 44 prevents the cam 46 from going beyond center position when inserted into crank 26. Also a slit through the center of crank 26 opening provides a constant spring action which maintains a tight fit on cam 46 which is slightly larger than cam opening of crank 26. Cam 46 having a matched opening in crank 26 is designed so only one cam ridge 45 can be in contact with shoe FIG. 7-23 at a time. The two side ridges 45 extending further from center of cam 46 allow center cam ridge 45 to drop from axis alignment of shoe face 23 as shown by FIG. 7 which also shows the three possible cam positions. FIG. 6 tab 47 prevents cam 46 from rotating and also maintains a snug fit for cam 46 at all times. Cam 46 is provided with a screwdriver or similar keyed slot for adjustment purposes. A cam adjustment access is shown in FIG. 3-42.

An alternative method of dealing with different wheelbase lengths is to provide labels for the indicators FIG. 3-18. The scales FIG. 2-50 and 52 having different values so as to coincide with the users wheelbase length.

Still another alternative would be to provide a simple conversion chart which would provide extreme accuracy to the user.

The preferred composition of all specially molded parts would be of a plastic material.

The ideal ball and socket or swivel units FIG. 3 and 4-16 are available as pen and pencil holders, marketed as funnel and swivels.

Thus the reader will see that the recreational vehicle leveler of this invention provides a highly reliable, economical device that is easily understood and can be used to a great advantage by anyone capable of operating a recreational vehicle. Furthermore, the leveling device has additional advantages in that:

it simultaneously gives readings for four corners of a vehicle with only one minor adjustment;

it enables the user to level his vehicle in one fast maneuver, eliminating the need to make repeated attempts in order to level a vehicle;

it eliminates the need for expensive hydraulic levelers often costing between $3000.00 and $4500.00; and it is affordable by all recreational vehicle users costing less than the cost of a tank of gasoline for the smallest of RV's.

Although the description above contains many specifities, these should not be construed as limiting the scope of the invention but as merely providing illustrations of some of the presently preferred embodiments of this invention. For example, the housing can have other shapes, such as oval, square, or even round. The circular bubble level can be replaced with straight line levels, one for the longitudinal direction and the other for the latitudinal direction. The bubble levels can be eliminated completely by using weights to balance the upper housing from a central balance point which would make the leveling device completely automatic, but require extreme care to keep the device operating properly. The adjustable cam can be eliminated by using changeable labels on the indicators, etc.

Thus the scope of the invention should be determined by the appended claims and their legal equivalents, rather than by the examples given.

I claim:

1. A four-point, mechanical, vehicle leveling device comprising:
   (a) a base unit;
   (b) a pivotal support attached to the base;
   (c) an upper housing affixed to the pivotal support;
   (d) a horizontal level indicating means affixed to the upper housing; and
   (e) four mechanical measuring indicating means affixed to the upper housing having a ratio adjustment means, said measuring indicating means giving indication of elevational differences at four points relative to a true level surface, whereby vehicle attitude adjustment can be made based on the elevational differences noted on the measuring indicating means.

* * * * *